United States Patent
Altes et al.

(10) Patent No.: US 9,166,275 B2
(45) Date of Patent: Oct. 20, 2015

(54) WINDOW PANE HAVING AN ANTENNA

(75) Inventors: Jens Altes, Aachen (DE); Rolf Kötte, Alsdorf (DE); Michael Labrot, Aachen (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 297 days.

(21) Appl. No.: 13/814,730

(22) PCT Filed: Aug. 4, 2011

(86) PCT No.: PCT/EP2011/063481
§ 371 (c)(1),
(2), (4) Date: Feb. 6, 2013

(87) PCT Pub. No.: WO2012/019964
PCT Pub. Date: Feb. 16, 2012

(65) Prior Publication Data
US 2013/0140847 A1    Jun. 6, 2013

(30) Foreign Application Priority Data
Aug. 11, 2010 (EP) .................................. 10172490

(51) Int. Cl.
*H01Q 1/12* (2006.01)
*H01Q 1/32* (2006.01)
*B32B 17/10* (2006.01)

(52) U.S. Cl.
CPC ........ *H01Q 1/1271* (2013.01); *B32B 17/10036* (2013.01); *B32B 17/10293* (2013.01); *H01Q 1/1214* (2013.01); *H01Q 1/3275* (2013.01)

(58) Field of Classification Search
CPC ..... H01Q 1/1271; H01Q 1/32; H01Q 1/3275; H01Q 1/325; H01Q 1/3266; H01Q 1/3291; H01Q 1/1214; B32B 17/10036; B32B 17/10293

USPC .............. 428/137; 52/786.1, 786.11, 786.12, 52/786.13; 296/146.1, 152, 210
See application file for complete search history.

(56) References Cited

U.S. PATENT DOCUMENTS 4,306,241 A * 12/1981 Sono ............................. 343/713
5,398,452 A   3/1995 Schilde et al.
(Continued)

FOREIGN PATENT DOCUMENTS

DE    34 10 950    9/1985
DE    43 41 442    7/1994
(Continued)

OTHER PUBLICATIONS

PCT Written Opinion of Application PCT/EP2011/063481 filed on Aug. 8, 2011 in the name of Saint-Gobain Glass France (with English translation).
(Continued)

*Primary Examiner* — Robert Karacsony
(74) *Attorney, Agent, or Firm* — Steinfl & Bruno LLP

(57) ABSTRACT

A motor vehicle window pane with antenna mount is described. The motor vehicle window pane with antenna mount has an opening in a composite pane made of an outer pane, an intermediate layer, and an inner pane. An adhesive is disposed on the outer pane on a top in a region around the opening. A mounting plate is fixed on the adhesive. An antenna housing is disposed on the mounting plate and has a rod-shaped antenna mount within the opening and below a recess.

22 Claims, 4 Drawing Sheets

(56) References Cited

U.S. PATENT DOCUMENTS

Figure 1:
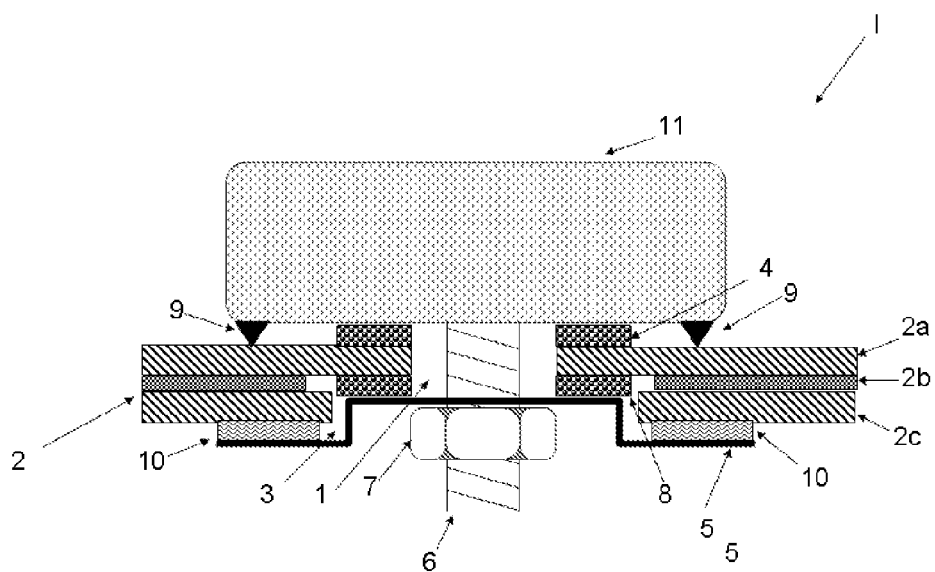

| | | |
|---|---|---|
| 2006/0101737 A1 | 5/2006 | Platz |
| 2008/0100521 A1* | 5/2008 | Herbert et al. ................ 343/713 |
| 2010/0059253 A1 | 3/2010 | Labrot et al. |

FOREIGN PATENT DOCUMENTS

| | | |
|---|---|---|
| DE | 202 18 215 | 5/2004 |
| DE | 10 2004 011 662 | 10/2005 |
| DE | 10 2006 056 501 | 6/2008 |
| DE | 10 2007 012 486 | 9/2008 |
| JP | 2004-166202 | 6/2004 |
| WO | 2004/086556 | 10/2004 |

OTHER PUBLICATIONS

International Search Report of Application PCT/EP2011/063481 filed on Aug. 8, 2011 in the name of Saint-Gobain Glass France (with English translation).

* cited by examiner

WINDOW PANE HAVING AN ANTENNA

CROSS REFERENCE TO RELATED APPLICATIONS

The present application is the US national stage of International Application PCT/EP2011/063481 filed on Aug. 4, 2011 which, in turn, claims priority to European Patent Application EP 10172490.4 filed on Aug. 11, 2010.

The invention relates to a composite pane with an antenna mount, a method for its production and use.

Modern motor vehicles are usually outfitted with various antennas to receive and also to transmit electromagnetic signals. Besides antennas fully integrated in the glass, antennas protruding from the vehicle are, furthermore, also mounted on the vehicle. Commonly, antennas, so-called "shark fins", are also situated in the rear roof section. As part of increasingly strict environmental protection regulations, there is an increasing trend toward weight reduction in automotive engineering. Besides the use of composite materials, more and more glass panes are used for appearance and design reasons. When antennas are installed on glass roofs, this is in many cases possible only on single pane safety glass (SPSG). However, frequently, for stability reasons and for safety, auto roof panes made of laminated safety glass (LSG) are desirable. This frequently necessitates dividing the roof into two parts. The larger part of the auto roof is made of laminated safety glass (LSG); the antenna region, in contrast, comprises single plate safety glass (SPSG). Improved production methods enable the installation of increasingly larger and more stable glass panes in side, rear, and, especially, roof windows. As with vehicle body parts made of steel, for instance, vehicle roofs, mounts must also be installed in the case of components made of glass. In particular, in the case of whole glass or panorama roofs, elements of the antenna can or must be fixed on the glass surface. Because of the centrifugal and flow forces acting on the glass roof and on the antenna, the antenna is frequently secured in the glass member by a bolt connection. In addition, the bolt connection of the antenna on the glass member also enables and facilitates the exchange of defective antenna parts. Furthermore, the bolt connection of antennas to the glass member enables space-saving storage of roof panes for various antenna systems. In these cases, the actual antennas can be installed simply during final assembly, whereas, at the same time, the glass panes equipped with bolt mountings can be space-savingly stored next to one another.

DE 10 2007 012 486 A1 discloses a motor vehicle roof with a fixed glass element that has a pane surrounded by a support frame and an antenna element connected to the fixed glass element.

DE 3410950 A1 discloses an antenna arrangement for motor vehicles. An antenna rod is connected, via a base part fixed on the pane, to a mating piece fixed on the back side of the pane. Together, the mating piece and the base part form a coupling capacitor.

DE 10 2004 011 662 A1 discloses a motor vehicle antenna fixture arrangement. The motor vehicle part has on its upper side an electrically insulating layer and beneath it a mass surface.

WO 2004/086556 A1 discloses an antenna fastening device on body elements or glass roofs of motor vehicles.

DE 10 2006 056 501 A1 discloses a laminated glass sheet with a fixing device introduced into a through-hole for objects, for example, antennas.

Due to the mechanical properties of window panes, realization of a resistant and stable fixing of devices or objects such as antennas on composite glass panes is difficult. Improperly performed work, in particular in the case of bolt connections, can easily result in damage or complete shattering of the pane. The installation of the bolt connection and of the antenna connection makes drilled holes in the glass necessary. In particular, the region of the glass adjacent the drilled holes is, due to the low flexibility of glass materials, as a rule very susceptible to mechanical forces or stresses. When the forces acting on the glass in the region of the drilled hole are dissipated unevenly, the pane can readily break.

The object of the invention is to provide a motor vehicle window pane with an antenna, which ensures high stability of the motor vehicle window pane at the time of installation of the antenna and during further operation.

The object of the present invention is accomplished according to the invention by a vehicle window pane with an antenna mount according to claim 1. Preferred embodiments emerge from the dependent claims.

A method for producing a vehicle window according to the invention and its use emerge from other coordinated claims.

The vehicle window pane with antennas according to the invention comprises an opening in a composite pane made of an outer pane, intermediate layer, and inner pane. The term "inner pane" designates the pane situated in the vehicle interior; the term "outer pane" designates the outward positioned pane. The outer pane and/or inner pane preferably have a thickness of 1 mm to 4 mm, particularly preferably 1.4 mm to 2.5 mm. The outer pane and the inner pane can have different thicknesses. The intermediate layer contains preferably PVB (polyvinyl butyral), PET (polyethylene terephthalate), PVC (polyvinyl chloride), PU (polyurethane), EVA (polyethyl vinyl acetate), and mixtures as well as copolymers thereof. The intermediate layer preferably has a thickness of 0.30 mm to 0.9 mm, preferably 0.50 mm to 0.80 mm. The composite pane has two drilled holes positioned one over the other. The diameter of the drilled hole in the inner pane is preferably larger than the diameter of the drilled hole in the outer pane and, thus, forms a recess in the inner pane. A precise description of the two drilled holes positioned one over the other is also disclosed in DE 10 2006 056501 A1. An adhesive is disposed on the opposite side of the composite pane above the opening of the outer pane. The adhesive is preferably more expansive than the opening of the inner pane. In contrast to the arrangement according to the prior art depicted in DE 10 2006 056501 A1 in FIG. 1 and FIG. 2, in the event of a stress in the region of the opening, the force applied is routed via the adhesive into the composite made of outer pane, intermediate layer, and inner pane. The outer pane is less stressed and does not break or breaks less readily. The adhesive joint brings about a homogeneous, large-area force effect on the composite of panes.

Above the adhesive, a mounting plate is fixedly installed and an antenna housing is installed, reversibly detachably or fixedly disposed on the mounting plate. The term "antenna housing" includes, in the context of the invention, the actual antenna, cabling, and, as the case may be, control electronics. A rod-shaped antenna mount is preferably provided with a screw thread and fixedly disposed below the actual antenna housing. The term "rod-shaped" includes, in the context of the invention, both cylindrical and cuboid elements or elements with a polygonal base surface. A clip or a nut on the antenna mount within or below the recess fixes the antenna housing on the mounting plate. The mounting plate is fixed on the composite pane via the adhesive. When the clip or the nut below the inner pane of the antenna mount is released, the antenna housing above the mounting plate can be readily and reversibly removed. The exchangeability of the antenna in the region of the antenna mount is another important objective.

Below the opening, a sealing ring and a supporting ring or a washer are preferably disposed. In the context of the invention, the term "below the opening of the pane" refers to the side of the composite pane facing away from the antenna housing.

The sealing ring and the supporting ring are preferably disposed in the opening within the inner pane.

The sealing ring and the supporting ring are preferably disposed in the recess.

The adhesive is preferably surrounded by an outer sealing ring. The outer sealing ring seals the adhesive joint against the outside and prevents the penetration of moisture and dirt.

The opening preferably has a diameter of 0.5 cm to 5 cm, particularly preferably of 1 cm to 2 cm. The opening is preferably circular.

The pane preferably comprises or includes flat glass (float glass), quartz glass, borosilicate glass, soda-lime glass, or polymers, preferably polyethylene, polypropylene, polycarbonate, polymethyl methacrylate, and/or mixtures thereof. The panes preferably have a mean light transmission (unless otherwise specified as light transmission for light type A and a 2°-standard observer according to DIN 5033 for light of the wavelengths from 380 nm to 780 nm) of more than 80%, preferably more than 90%. Alternatively, tinted or darkened panes with reduced transmission, so-called sunroofs, are also possible.

The adhesive preferably contains adhesives, moisture-reactive hot-melt adhesives, adhesives or heat-curing adhesive, preferably polyurethane prepolymers, polyesters, polyolefins, polyurethanes, silicones, polyacrylates, polyvinyl acetates, polyepoxides, and/or polyamides as well as mixtures and/or copolymers thereof, particularly preferably polyurethanes.

The mounting plate and/or supporting ring preferably contain metal and/or polymers, preferably iron, manganese, chromium, nickel, cobalt, aluminum, vanadium, tungsten, titanium, or alloys thereof and/or polyethylene, polypropylene, polystyrene, polyurethanes, polycarbonates, polymethyl methacrylates, polyacrylates, polyesters, polyamides, polyethylene terephthalate, polybutylene terephthalate, and/or mixtures or copolymers thereof.

The antenna mount, clips, and/or nut preferably contain metal and/or polymers, preferably iron, manganese, chromium, nickel, cobalt, aluminum, vanadium, tungsten, titanium, or alloys thereof and/or polyethylene, polypropylene, polystyrene, polyurethanes, polycarbonates, polymethyl methacrylates, polyacrylates, polyesters, polyamides, polyethylene terephthalate, polybutylene terephthalate, and/or mixtures or copolymers thereof.

The invention further includes a method for producing a vehicle window pane with antenna. In the pane made of composite glass, in a first step, an opening is drilled and/or cut in an outer and inner pane. This step can preferably take place even before the bending and laminating of the inner and outer pane. Before the actual bending process of the composite pane, holes (opening) positioned one over the other are drilled for this purpose in the outer pane and inner pane. The hole in the inner pane is preferably larger than the hole in the outer pane and thus yields a recess in the composite pane on the side of the inner pane. The functionality of the recess, i.e., of the smaller hole diameter of the outer pane is also described in DE 10 2006 056501 A1 in [0012] to [0017]. During the bending process, edge stresses, which generate additional stability, form in the hole region. Then, above the outer pane of the composite pane, an adhesive is applied around the entire opening. The term "outer" refers to the outward facing side of the pane built into the vehicle; the term "inner" refers to the inward facing side of the pane built into the motor vehicle. In a next step, a mounting plate is installed on the adhesive. Then, an arrangement consisting of the antenna housing with an antenna mount fixed to the antenna housing is installed on the mounting plate, with the antenna mount being guided through the opening during the process. Then, the antenna housing is fixed on the inner pane, preferably within the recess, with a nut or clip. In the context of the invention, the term "antenna housing" includes the actual antenna, cabling, and, as the case may be, control electronics. In this embodiment, the antenna mount can also function as an electrical conductor. In a subsequent step, the other electrical connections and/or control elements can be installed.

The invention further includes an alternative method for producing a vehicle window pane with an antenna mount. In the pane made of composite glass, an opening is drilled and/or cut as described above in an outer pane and inner pane. In the following step, an adhesive is applied on a mounting plate. Then, the mounting plate is applied with the adhesive-bearing side above the opening on the outer pane. In the next step, the adhesive is placed between the mounting plate and the outer pane. In a next step, an arrangement consisting of an antenna housing with an antenna mount fixed on the antenna housing is applied on the mounting plate, with the antenna mount being guided through the opening. Then, the antenna housing is fixed with a nut or a clip on the inner pane, preferably in the recess. The term "antenna housing" includes, in the context of the invention, the actual antenna, cabling, and, as the case may be, control electronics. In this embodiment, the antenna mount can also function as an electrical conductor. In a subsequent step, the other electrical connections and/or control elements can be installed.

The recess is preferably dimensioned such that the supporting ring can be fitted into the recess.

The intermediate space between the outer supporting ring, the adhesive strip, and the composite pane is preferably sealed with a sealing ring. The sealing ring prevents the penetration of air and moisture.

The invention further includes the use of the motor vehicle window pane as a roof panel of a motor vehicle.

The invention is explained in detail in the following with reference to drawings. The drawings are purely schematic and not true to scale. The drawings in no way restrict the invention.

Figure 2:
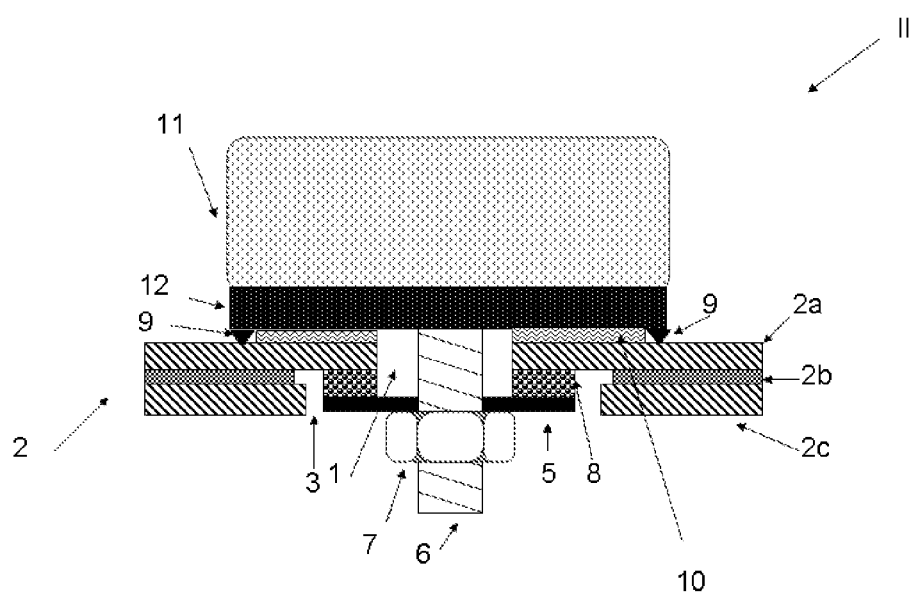
Figure 3:
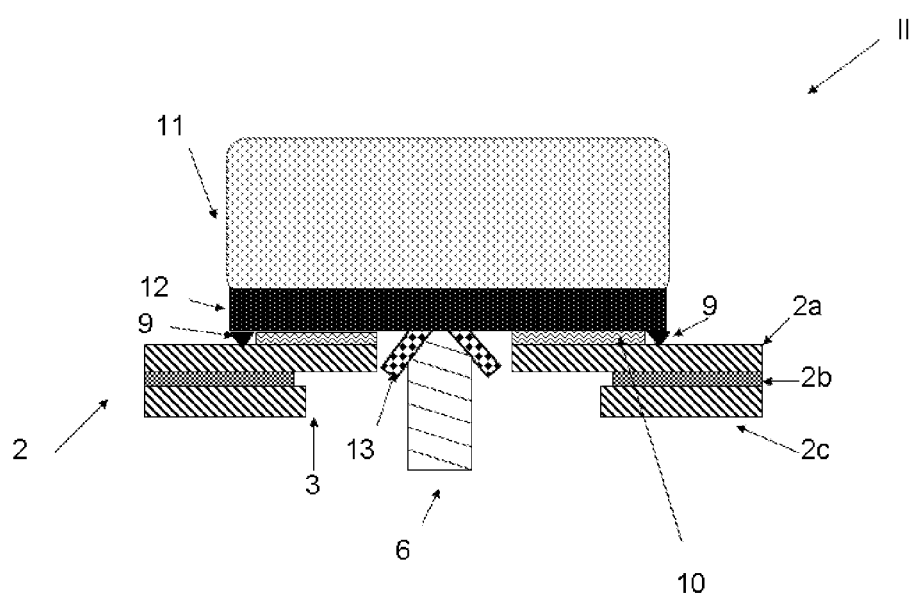
Figure 4:
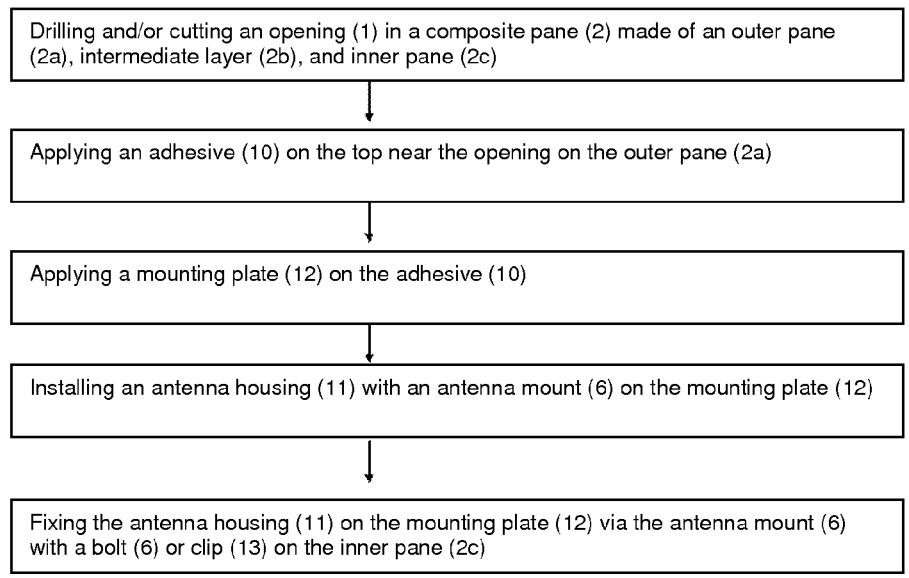

They depict:

FIG. 1 a schematic view of a motor vehicle window pane with antenna mount according to the prior art, FIG. 2 a schematic view of a motor vehicle window pane with antenna mount according to the invention, FIG. 3 a schematic view of another embodiment of the motor vehicle window pane with antenna mount according to the invention, and FIG. 4 a flow diagram of the method according to the invention.

FIG. 1 depicts a schematic view of a motor vehicle window pane (I) with antenna according to the prior art. The composite pane (2) comprises an outer pane (2a), intermediate layer (2b), and inner pane (2c). The term "inner pane" designates the pane situated in the vehicle interior; the term "outer pane" designates the outward positioned pane. A sealing ring (8) is disposed on a supporting ring (5) within the opening (1) and a recess (3) of the inner pane (2c). The part of the outer pane (2a) adjacent the opening (1) is situated between the sealing ring (8) and another sealing ring (4). The antenna housing (11) is disposed above another sealing ring (9). A bolt (6) with a nut (7) as well as a surrounding adhesive (10) between the supporting ring (5) and the inner pane (2c) fix the mounting plate (12) above the opening (1) of the pane (2). The antenna mount (6) can also serve as an electrical connector and supply current to the electrical equipment disposed in the antenna housing. Experiments with a load in the region of the opening (1) result in glass breakage of the outer pane (2a). In particular, with a strong lateral stress, the effective force is transferred through the sealing rings (4, 8) to the outer glass (2a), which does not withstand the stress and breaks.

FIG. 2 depicts a schematic view of a motor vehicle window pane (II) according to the invention. The composite pane (2) comprises, as in FIG. 1, an outer pane (2a), intermediate layer (2b), and inner pane (2c). The term "inner pane" designates the pane situated in the vehicle interior; the term "outer pane" designates the outward positioned pane. A sealing ring (8) is disposed on a supporting ring (5) within the opening (1) and a recess (3) of the inner pane (2c). The part of the outer pane (2a) adjacent the opening (1) is situated on the sealing ring (8). On the side facing away from the sealing ring, an adhesive (10) bonds the mounting plate (12) to the outer pane (2a). An antenna mount (6), which protrudes from the antenna housing (11) and is fixedly connected thereto with a nut (7), supporting ring (5), and a mounting plate (12) fix the antenna housing (11) above the opening (1) on the composite pane (2). The use of the mounting plate (12) also enables the replacement of a defective antenna or the antenna housing (11) without removing the adhesive (10). The adhesive (10) is protected against dust and moisture by another sealing ring (9). In contrast to the arrangement (I) according to the prior art depicted in FIG. 1, in the event of stressing in the region of the opening (1), the force applied is diverted into the composite made of an outer pane (2a), intermediate layer (2b), and inner pane (2c). The outer pane (2a) is less stressed and does not break. Experiments demonstrated a clearly higher break resistance of the embodiment according to the invention depicted in FIG. 2 compared to the embodiment according to the prior art in FIG. 1.

FIG. 3 depicts a schematic view of another embodiment of the motor vehicle window pane (II) according to the invention. The composite pane (2) comprises, as in FIG. 2, an outer pane (2a), intermediate layer (2b), and inner pane (2c). Adjacent the opening (1) in the outer pane (2a), an adhesive (10) bonds a mounting plate (12) to the outer pane (2a). One or a plurality of clips (13) fix the arrangement consisting of mounting plate (12) and an antenna housing (11) above the opening (1) of the outer pane (2a) of the composite pane (2). The use of the mounting plate (12) with a clip (13) enables the quick replacement of a defective antenna or of the antenna housing (11) without removing the adhesive (10). The adhesive (10) is protected against dust and moisture by another sealing ring (9). When the clip (13) below the inner pane (2c) is released, the antenna housing above the mounting plate (12) can be easily removed.

FIG. 4 depicts a flow diagram of a method according to the invention. In a first step, an opening is drilled and/or cut in a composite pane (2) made of an outer pane (2a), intermediate layer (2b), and inner pane (2c). A mounting plate is fixed on the outer pane (2a) above and near the opening (1) using an adhesive (10). Depending on the adhesive system used, the adhesive (10) can be cured by moisture, heat, atmospheric oxygen, or UV light. With this configuration, optimized transport and, subsequently, the installation of the remaining parts, which clearly require more space, are now possible. In a next step, an arrangement consisting of antenna housing (11) with an antenna mount (6) attached to the antenna housing (11) is installed on the mounting plate (12), with the antenna mount (6) guided through the opening (1). Then, the antenna housing (11) is fixed with a nut (7) or clip (13) on the inner pane (2c) below or within the recess (3). In a final step, additional electrical connections can be installed.

LIST OF REFERENCE CHARACTERS (1) opening
(2) pane,
(2a) outer pane,
(2b) intermediate layer,
(2c) inner pane,
(3) recess,
(4) sealing ring,
(5) supporting ring,
(6) antenna mount,
(7) nut,
(8) sealing ring,
(9) sealing ring,
(10) adhesive,
(11) antenna housing,
(12) mounting plate
(13) clip, and
(I,II) window pane with antenna mount according to the prior art and according to the invention.

The invention claimed is:
1. A vehicle window pane with antenna mount, comprising:
an opening in a composite pane, the composite pane being made of an outer pane, an intermediate layer, and an inner pane, wherein the inner pane has a recess adjacent the opening,
an adhesive disposed on the outer pane on a top of a region around the opening, wherein the adhesive is more expansive than the opening of the inner pane, and a mounting plate disposed and fixed on the adhesive,
an antenna housing on the mounting plate, wherein the antenna housing comprises a rod-shaped antenna mount within the opening as well as within and/or below the recess and is reversibly detachably fixed on the mounting plate, and
a nut or a clip on the rod-shaped antenna mount, which fixes the antenna housing on the mounting plate.
2. The vehicle window pane according to claim 1, wherein a sealing ring and a supporting ring are disposed in the opening within the recess.
3. The vehicle window pane according to claim 1, wherein the adhesive is surrounded by an outer sealing ring.
4. The vehicle window pane according to claim 1, wherein the opening has a diameter of 0.2 cm to 5 cm.
5. The vehicle window pane according to claim 1, wherein the composite pane contains glass, polymers, or mixtures thereof.
6. The vehicle window pane according to claim 1, wherein the adhesive contains adhesives, moisture-reactive hot-melt adhesives or heat-curing adhesive.
7. The vehicle window pane according to claim 2, wherein the mounting plate, the supporting ring, or the mounting plate and the supporting ring contain metal, polymers or metal and polymers.
8. The vehicle window pane according to claim 1, wherein the rod-shaped antenna mount, clip, and/or nut contain metal, polymers, or metal and polymers.
9. A method comprising:
using the vehicle window pane according to claim 1 as a roof panel of a motor vehicle.
10. The vehicle window pane according to claim 4, wherein the opening has a diameter of 1 cm to 2 cm.

11. The vehicle window pane according to claim 5, wherein the glass is flat glass, float glass, quartz glass, borosilicate glass or soda-lime glass.

12. The vehicle window pane according to claim 5, wherein the polymer is polyethylene, polypropylene, polycarbonate or polymethyl methacrylate.

13. The vehicle window pane according to claim 6, wherein the adhesive is polyurethane prepolymers, polyesters, polyolefins, polyurethanes, silicones, polyacrylates, polyvinyl acetates, polyepoxides, and/or polyamides, as well as mixtures and/or copolymers thereof.

14. The vehicle window pane according to claim 13, wherein the adhesive is polyurethane.

15. The vehicle window pane according to claim 7, wherein the metal is iron, manganese, chromium, nickel, cobalt, aluminum, vanadium, tungsten, titanium or alloys thereof.

16. The vehicle window pane according to claim 7, wherein the polymer is polyethylene, polypropylene, polystyrene, polyurethanes, polycarbonates, polymethyl methacrylates, polyacrylates, polyesters, polyamides, polyethylene terephthalate, polybutylene terephthalate, and/or mixtures or copolymers thereof.

17. The vehicle window pane according to claim 8 wherein the metal is iron, manganese, chromium, nickel, cobalt, aluminum, vanadium, tungsten, titanium, or alloys thereof.

18. The vehicle window pane according to claim 8 wherein the polymer is polyethylene, polypropylene, polystyrene, polyurethanes, polycarbonates, polymethyl methacrylates, polyacrylates, polyesters, polyamides, polyethylene terephthalate, polybutylene terephthalate, and/or mixtures or copolymers thereof.

19. A method for producing a vehicle window pane with antenna mount comprising:
   drilling and/or cutting an opening in a composite pane made of an outer pane, an intermediate layer, and an inner pane, wherein the inner pane is provided with a recess,
   applying an adhesive above the opening on the outer pane, wherein the adhesive is more expansive than the opening of the inner pane,
   applying a mounting plate on the adhesive,
   installing an antenna housing with an antenna mount on the mounting plate, wherein the antenna mount is guided through the opening, and
   fixing the antenna housing on the mounting plate via the antenna mount with a nut or a clip below or in the recess.

20. The method according to claim 19, wherein an intermediate space between the mounting plate, the adhesive, and the outer pane of the composite pane is sealed with a sealing ring.

21. A method for producing a vehicle window pane with antenna mount, comprising:
   drilling and/or cutting an opening in a composite pane made of an outer pane, an intermediate layer, and an inner pane, wherein the inner pane is provided with a recess,
   applying an adhesive on a mounting plate, wherein the adhesive is more expansive than the opening of the inner pane,
   applying the mounting plate above the opening on the outer pane,
   placing the adhesive between the mounting plate and the outer pane,
   installing an antenna housing with an antenna mount on the mounting plate, wherein the antenna mount is guided through the opening, and
   fixing the antenna housing on the mounting plate via the antenna mount with a nut or a clip below or in the recess.

22. The method according to claim 21, wherein an intermediate space between the mounting plate, the adhesive, and the outer pane of the composite pane is sealed with a sealing ring.

* * * * *